(12) United States Patent
Banerjee et al.

(10) Patent No.: US 10,193,360 B2
(45) Date of Patent: Jan. 29, 2019

(54) UNINTERRUPTIBLE POWER SUPPLY RECEPTIVE TO DIFFERENT TYPES OF OUTPUT MODULES

(71) Applicant: Hewlett Packard Enterprise Development LP, Houston, TX (US)

(72) Inventors: Abhishek Banerjee, Houston, TX (US); Hai Ngoc Nguyen, Spring, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 182 days.

(21) Appl. No.: 15/142,096

(22) Filed: Apr. 29, 2016

(65) Prior Publication Data

US 2017/0317510 A1 Nov. 2, 2017

(51) Int. Cl.
*H02J 7/00* (2006.01)
*H02J 9/06* (2006.01)

(52) U.S. Cl.
CPC .......... *H02J 7/0024* (2013.01); *H02J 7/0045* (2013.01); *H02J 9/061* (2013.01)

(58) Field of Classification Search
None
See application file for complete search history.

(56) References Cited

U.S. PATENT DOCUMENTS

| | | | | |
|---|---|---|---|---|
| 7,132,833 B2* | 11/2006 | Layden | ............... | H01M 2/1077 324/429 |
| 7,379,305 B2* | 5/2008 | Briggs | ................... | G06F 1/181 361/727 |
| 7,634,667 B2* | 12/2009 | Weaver | ..................... | H02J 9/00 307/66 |
| 2004/0168818 A1* | 9/2004 | Layden | ................. | H02J 7/0031 174/50 |
| 2005/0225914 A1* | 10/2005 | King | ........................ | H02J 7/34 361/62 |
| 2007/0217125 A1* | 9/2007 | Johnson | .................. | H02J 9/062 361/600 |
| 2011/0307733 A1* | 12/2011 | Tokunaga | ............. | H02J 7/0024 713/340 |
| 2016/0043555 A1* | 2/2016 | Howell | ................... | G06F 1/263 307/23 |
| 2016/0134160 A1* | 5/2016 | Schultz | ............... | H01M 10/441 307/66 |

* cited by examiner

*Primary Examiner* — Rexford Barnie
*Assistant Examiner* — David Shiao
(74) *Attorney, Agent, or Firm* — Michael A. Dryja

(57) ABSTRACT

An uninterruptible power supply (UPS) includes a first battery set and a second battery set. The UPS includes a charging circuit to charge the battery sets using alternating current (AC) power. The UPS includes a slot receptive to insertion of different types of output modules that each include an inverter to convert direct current (DC) power from the first and second battery sets, including a first type that connects the first and second battery sets in parallel and a second type that connects the battery first and second sets in series.

16 Claims, 6 Drawing Sheets

UNINTERRUPTIBLE POWER SUPPLY RECEPTIVE TO DIFFERENT TYPES OF OUTPUT MODULES

BACKGROUND

An uninterruptible power supply (UPS) provides battery backup in case mains power fails, such as due to a power outage. In general, a UPS plugs into a wall outlet providing alternating current (AC) mains power, and a system like a computing system such as a computing device plugs into the UPS. While mains power is operational, the UPS indirectly or directly powers the connected system via the mains power, while at the same time charging its batteries. When mains power fails, the connected system receives power from the UPS's batteries until the mains power returns or the batteries become depleted.

DETAILED DESCRIPTION

As noted in the background section, an uninterruptible power system (UPS) provides battery backup to a system in case mains power fails. Existing UPSs are decidedly custom designed for particular input and output voltages, such as 115 nominal alternating current (AC) volts. Generally a given UPS design varies only in the amount of battery capacity as compared to other UPSs of a similar design. A UPS may have multiple inverters to convert the direct current (DC) power provided by its batteries to the desired output power (AC or DC) at the desired voltage. Each inverter decreases efficiency of the UPS, among other shortcomings.

Disclosed herein are techniques for a novel UPS that is receptive to different output module types. A UPS includes a first battery set, module, or string, and a second battery set, module, or string. The UPS includes a charging circuit to charge the battery sets using AC power. The UPS further is receptive to insertion of different types of output modules that each include an inverter—such as just one inverter—to convert DC power from the battery sets to a desired output voltage. Depending on the voltage of the AC mains power and the desired output voltage, a particular output module type is selected. One output module type may connect the battery sets in parallel, whereas another output module type may connect the battery sets in series.

As such, the same UPS design, with the same battery sets, can be used in a variety of different input and output voltage scenarios. Based on the needs of the inverter of an output module, the input DC voltage provided by the battery can be varied, with changing apparent power in kilovolt-amps (kVA), via the output module connecting the battery sets in series or in parallel. Input current is limited, resulting in efficiency increases, as well as resolving UPS battery sizing and heating issues. A UPS manufacturer can thus build one type of UPS, which may be in a 1U rack form factor, and provide multiple different UPSs by using output modules of different types.

Figure 1:
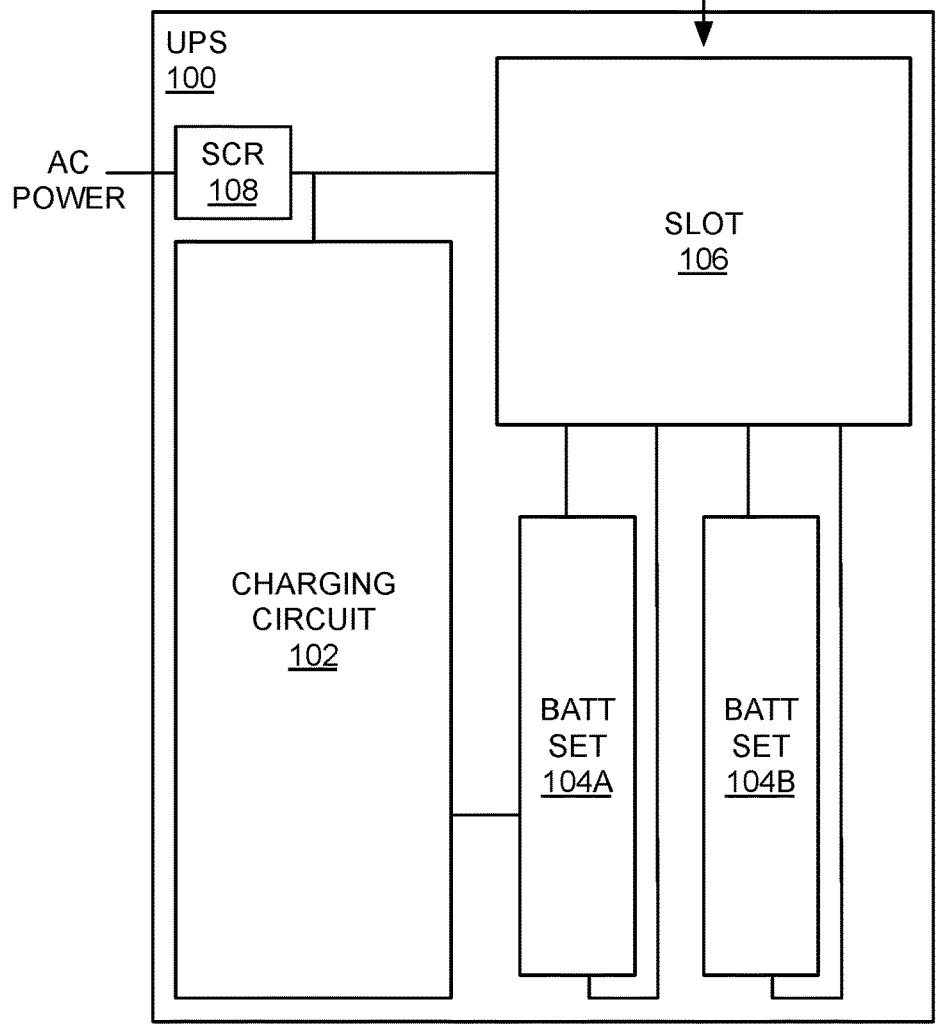
FIG. 1 is a diagram of an example uninterruptible power supply (UPS) that is receptive to different types of output modules.

FIG. 1 shows an example UPS 100. The UPS 100 includes a charging circuit 102. The UPS 100 includes a first battery set 104A and a second battery set 104B, which are collectively referred to as the battery sets 104, and which can also be referred to as battery modules or battery strings. The charging circuit 102 charges the battery sets 104 using AC power, such as AC mains power. A semiconductor-controlled rectifier (SCR) 108, or other type of rectifier, is disposed between this AC power and the charging circuit 102 to ensure that current does not flow from the UPS 100 back to the AC mains power. The battery sets 104 each have a pair of outputs that terminate at a slot 106 of the UPS 100.

The slot 106 is receptive to insertion of different types of output modules that each include an inverter to convert DC power from the battery sets 104, including a first type that connects the battery sets 104 in parallel and a second type that connects the battery sets 104 in series. The battery sets 104 are part of an incomplete electrical circuit within the UPS 100 without an output module having been inserted into the slot 106. It is the output module that completes an electrical circuit between the battery sets 104, by connecting the battery sets 104 in series or in parallel.

Figure 2:
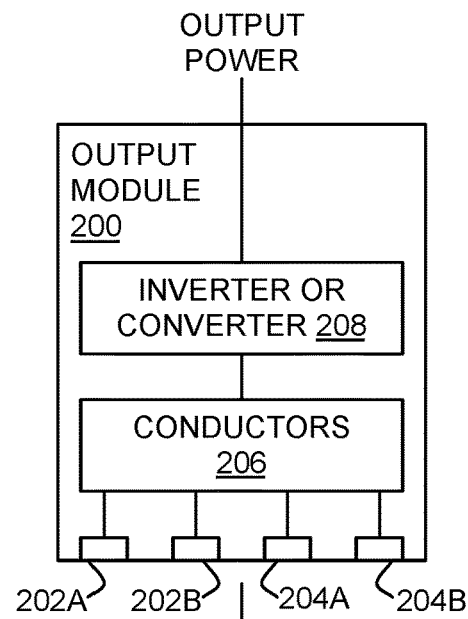
FIG. 2 is a diagram of an example output module that is connectable to the UPS of FIG. 1.

FIG. 2 shows an example output module 200 for insertion into the slot 106 of the UPS 100. The output module 200 includes a pair of first inputs 202A and 202B, collectively referred to as the first inputs 202, which connect to the corresponding pair of outputs of the first battery set 104A at the slot 106. The output module 200 includes a pair of second inputs 204A and 204B, collectively referred to as the second inputs 204, which connect to the corresponding pair of outputs of the second battery set 104B at the slot 106.

The output module 200 includes conductors 206 that connect the battery sets 104 in either parallel or in series. The output module 200 includes an inverter or a converter 208 to convert DC power from the battery sets 104 as connected in parallel or in series, to provide battery backup output power. The inverter or the converter 208 can be the only inverter or converter of the output module 200.

Figure 3:
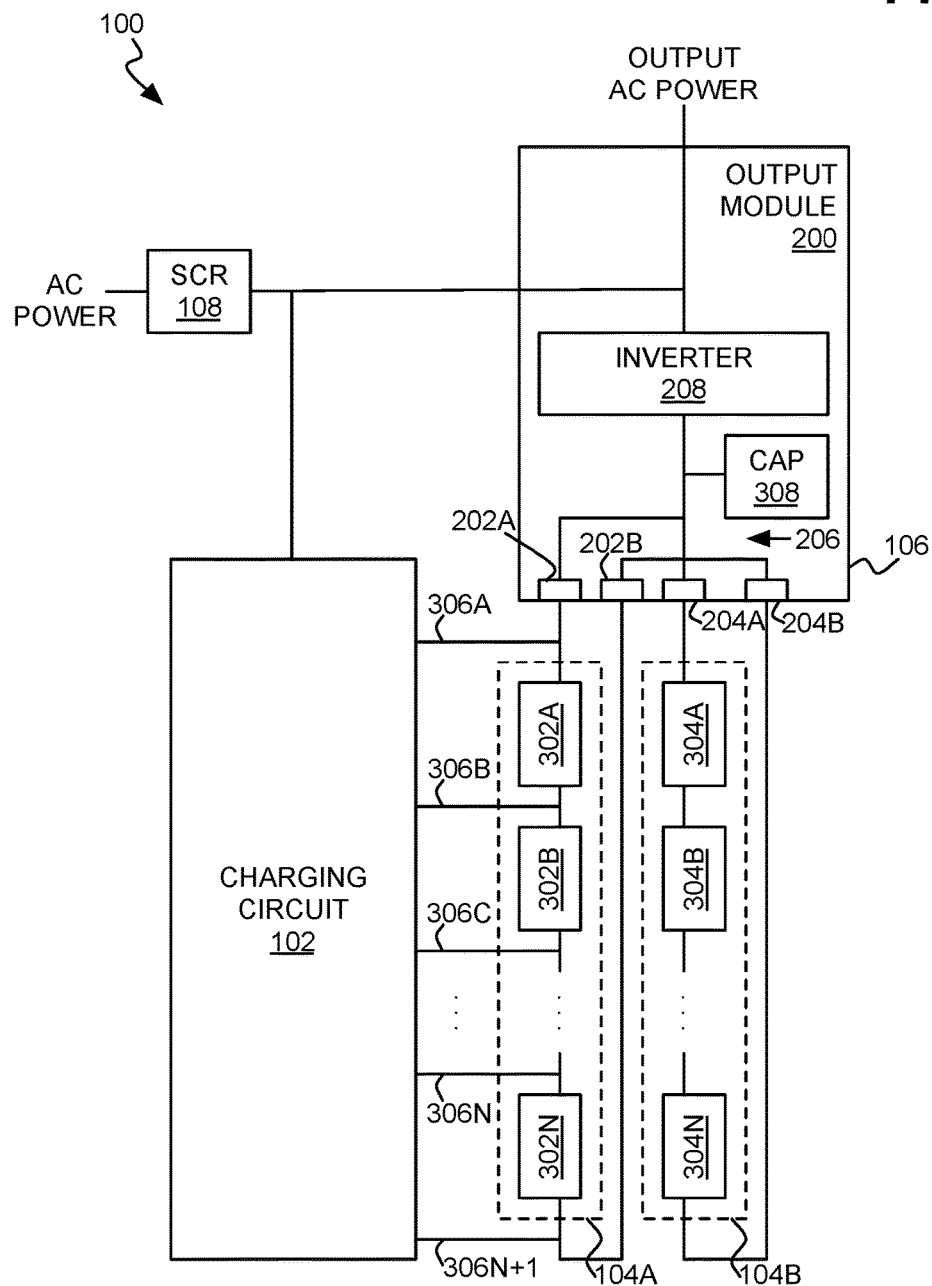
FIGS. 3, 4, 5, and 6 are diagrams of example UPS having connected thereto example output modules of different types.

FIG. 3 shows an example UPS 100 having installed therein an example output module 200 of a first type. The UPS 100 includes the SCR 108. The first battery set 104A of the UPS 100 includes batteries 302A, 302B, . . . , 302N, collectively referred to as the batteries 302, connected in series with one another. Each battery 302 can itself be made up of more than one battery. The second battery set 104B of the UPS 100 includes batteries 304A, 304B, . . . , 304N, collectively referred to as the batteries 304, connected in series with one another. Each battery 304 can itself be made up of more than one battery. Each battery set 104 may have an apparent power of 3 kVA. The charging circuit 102 of the UPS 100 can have charging outputs 306A, 306B, 306C, . . . , 306N, 306N+1, collectively referred to as the charging outputs 306, that may directly individually charge just the batteries 302 of the first battery set 104A. The charging 102 may indirectly charges the batteries 304 of the second battery set 1046 when the output module 200 is installed within the slot 106 of the UPS and the conductors 206 thereof complete an electrical circuit including the battery sets 104.

The conductors 206 of the output module 200 connect the battery sets 104 in parallel via the inputs 202 and 204 in FIG. 3. The inverter or the converter 208 in FIG. 3 is an inverter, which can be an only inverter of the output module 200, and which converts the DC power from the battery sets 104 to the output AC power. A capacitor 308 is connected between the inverter 208 and the conductors 206 (and thus between the inverter 208 and the battery sets 104) to stabilize the DC voltage provided by the battery sets 104 and to reduce ripple voltage effects.

When the AC power input to the UPS 100 is operational, the charging circuit 102 charges the battery sets 104 via this AC power (until the battery sets 104 have been completely charged), and likewise the output module 200 provides this AC power as its output AC power. When the AC power input to the UPS 100 fails, the output module 200 provides the output AC power by converting the DC power of the battery sets 104 to the same AC power, until the battery sets 104 have been depleted of charge. When the AC power input to the UPS 100 returns, the output module 200 again provides this AC power as the output AC power, and the charging circuit 102 recharges the battery sets 104 via this AC power. As such, the UPS 100 includes various switching mechanisms to connect and disconnect the AC power from the charging circuit 102 as the battery sets 104 need charging. Similarly, the output module 200 includes various switching mechanisms to connect and disconnect the AC power input from the output AC power of the module 200, and to connect and disconnect the converted AC power from the inverter 208 to the output AC power of the module 200.

In one implementation, the UPS 100 of FIG. 3 may be considered a low line UPS due to the type of the output module 200 connected thereto. The AC power input to the UPS 100 may have a voltage equal to half of the voltage between two lines of a split-phase AC power feed. For example, this voltage may nominally be 115 volts AC (VAC), which is half of the nominal 230 VAC of a split-phase AC power feed common in countries of North America as well as other countries. The battery sets 104 in parallel may provide 3 kVA of apparent power (i.e., equal to that of each battery set 104 individually) and the DC power output by the battery sets 104 in parallel may be 172-224 volts DC (VDC). The inverter 208 may be a 115 VAC, 3 kVA DC-to-AC inverter that thus nominally outputs 115 VAC.

Figure 4:
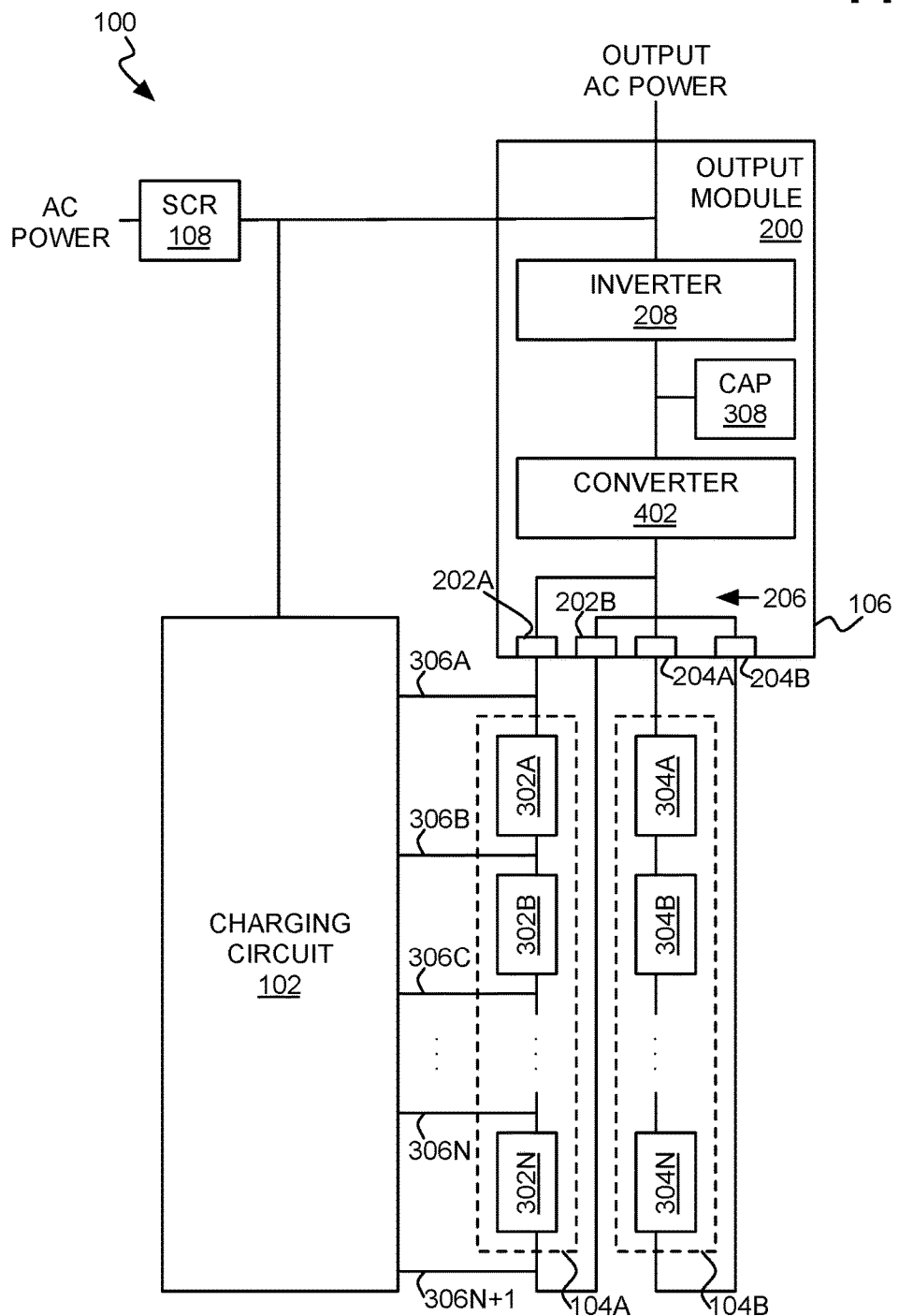

FIG. 4 shows an example UPS 100 having installed therein an example output module 200 of a second type. The UPS 100 includes the SCR 108. The first battery set 104A of the UPS 100 includes the batteries 302 connected in series with one another, and the second battery set 104B of the UPS 100 includes the batteries 304 connected in series with one another, as in FIG. 3. The charging circuit 102 of the UPS 100 can have charging outputs 306 that may individually charge the batteries 302 directly and the batteries 304 indirectly, as in FIG. 3.

The conductors 206 of the output module 200 connect the battery sets 104 in parallel via the inputs 202 and 204 in FIG. 4. A converter 402, which can be the only converter of the output module 200, converts the DC power from the battery sets 104 to different DC power. The inverter or converter 208 is an inverter that can be the only inverter of the module 200 and that converts the DC power from the converter 402 to the output AC power. The capacitor 308 is connected between the inverter 208 and the converter 402.

When the AC power input to the UPS 100 is operational, the charging circuit 102 charges the battery sets 104 via this AC power (until the battery sets 104 have been completely charged), and likewise the output module 200 provides this AC power as its output AC power. When the AC power input to the UPS 100 fails, the output module 200 provides the output AC power by converting the DC power of the battery sets 104 to different DC power, and then converting the different DC power to the same AC power as the AC power input, until the battery sets 104 have been depleted of charge. When the AC power input to the UPS 100 returns, the output module 200 again provides this AC power as the output AC power, and the charging circuit 102 recharges the battery sets 104 via this AC power. As such, the UPS 100 and the output module 200 includes various switching mechanisms, as described in relation to FIG. 3.

In one implementation, the UPS 100 of FIG. 4 may be considered a high line UPS due to the type of the output module 200 connected thereto. The AC power input to the UPS 100 may have a voltage equal to the voltage between two lines of a split-phase AC power feed. For example, this voltage may nominally be 230 VAC, which is the voltage of a split-phase AC power feed common in countries of North America as well as other countries. The battery sets 104 in parallel provide 3 kVA of apparent power (i.e., equal to that of each battery set 104 individually), and the DC power output by the battery sets 104 in parallel may be 172-224 VDC. The converter 402 may be a 3 kilowatt (kW) DC-to-DC converter that nominally outputs 380 VDC, and the inverter 402 may be a 3 kVA DC-to-AC inverter that nominally outputs 230 VAC.

Figure 5:
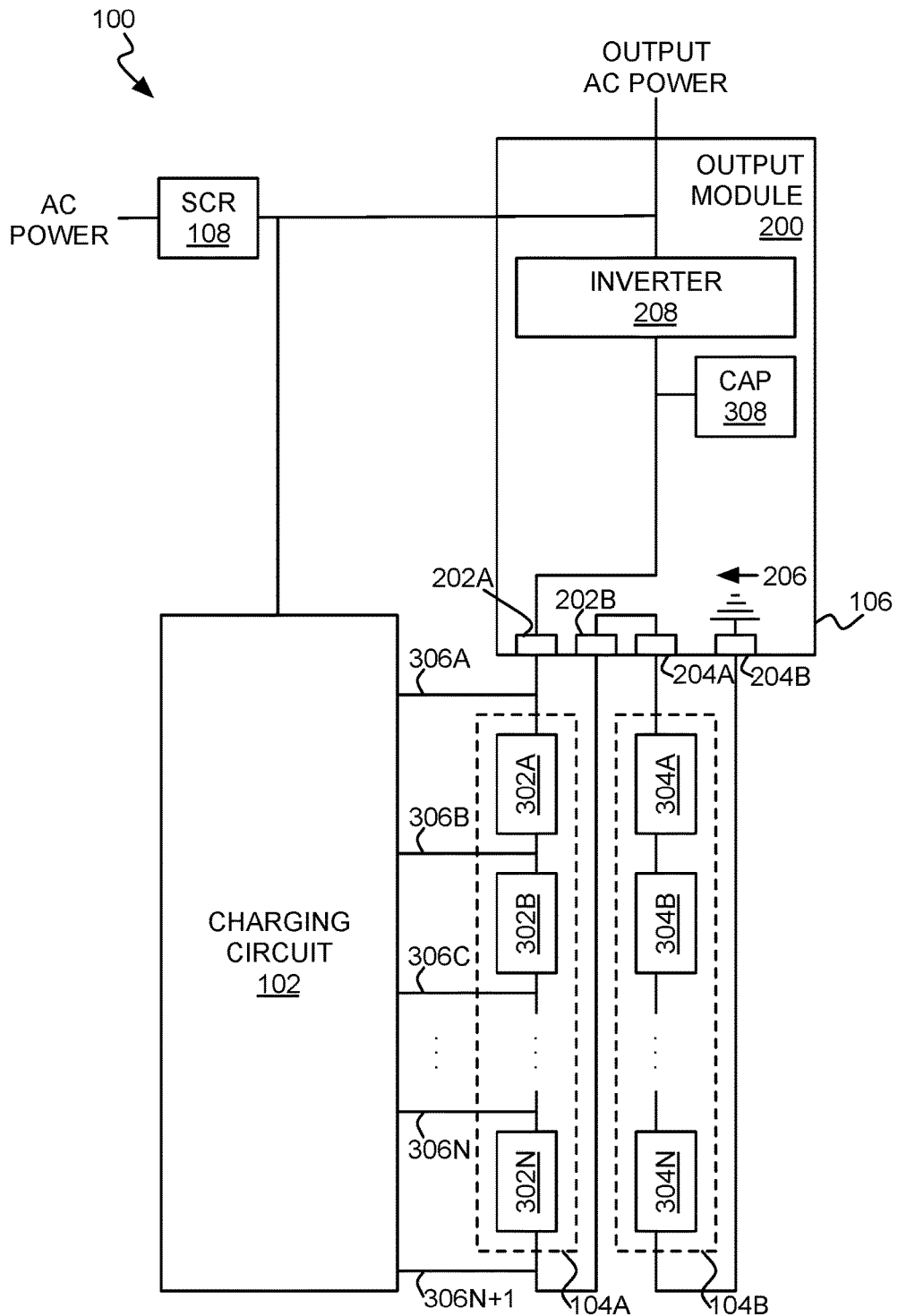

FIG. 5 shows an example UPS 100 having installed therein an example output module 200 of a third type. The UPS 100 includes the SCR 108. The first battery set 104A of the UPS 100 includes the batteries 302 connected in series with one another, and the second battery set 104B of the UPS 100 includes the batteries 304 connected in series with one another, as in FIGS. 3 and 4. The charging circuit 102 of the UPS 100 can have charging outputs 306 that may individually charge the batteries 302 directly and the batteries 304 indirectly, as in FIGS. 3 and 4.

The conductors 206 of the output module 200 connect the battery sets 104 in series via the inputs 202 and 204 in FIG. 5. The inverter or converter 208 is an inverter that can be an only inverter of the output module 200 and that converts the DC power from the battery sets 104 to the output AC power. The capacitor 308 is connected between the conductors 206 and the inverter 208.

When the AC power input to the UPS 100 is operational, the charging circuit 102 charges the battery sets 104 via this AC power (until the battery sets 104 have been completely charged), and likewise the output module 200 provides this AC power as its output AC power. When the AC power input to the UPS 100 fails, the output module 200 provides the output AC power by converting the DC power of the battery sets 104 to the same AC power, until the battery sets 104 have been depleted of charge. When the AC power input to the UPS 100 returns, the output module 200 again provides this AC power as the output AC power, and the charging circuit 102 recharges the battery sets 104 via this AC power. As such, the UPS 100 and the output module 200 include various switching mechanisms, as described in relation to FIG. 3.

In one implementation, the UPS 100 of FIG. 5 may be considered a high line UPS due to the type of the output module 200 connected thereto. The AC power input to the UPS 100 may have a voltage equal to the voltage between two lines of a split-phase AC power feed. For example, this voltage may nominally be 230 VAC, which is the voltage of a split-phase AC power feed common in countries of North America as well as other countries. The battery sets 104 in series provide 6 kVA of apparent power (i.e., equal to twice that of each battery set 104 individually), and the DC power output by the battery sets 104 in series may be 344-448 VDC. The inverter 208 may be a 6 kVA DC-to-AC inverter that nominally outputs 230 VAC.

Figure 6:
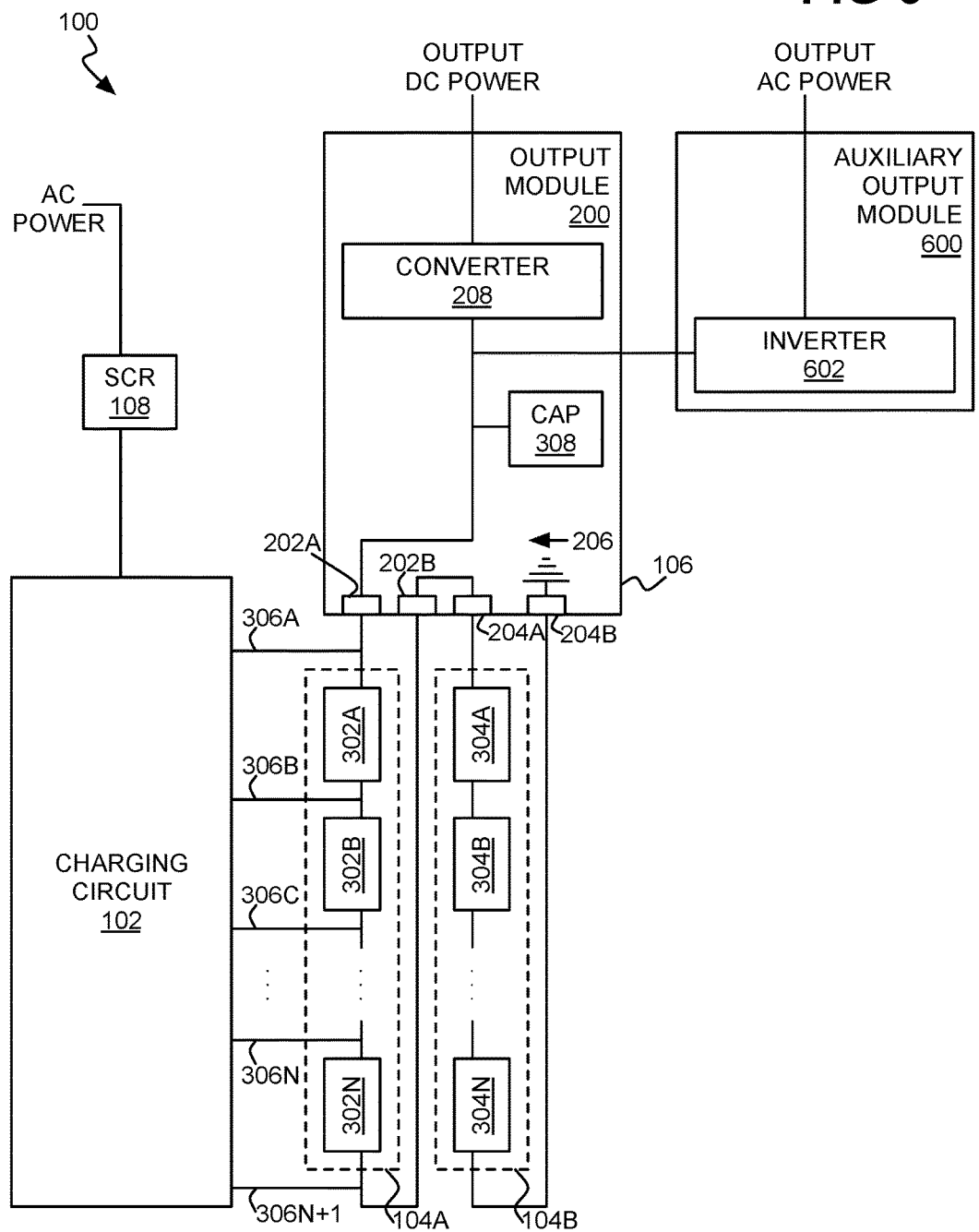

FIG. 6 shows an example UPS 100 having installed therein an example output module 200 of a fourth type. The UPS 100 includes the SCR 108. The first battery set 104A of the UPS 100 includes the batteries 302 connected in series with one another, and the second battery set 104B of the UPS 100 includes the batteries 304 connected in series with one another, as in FIGS. 3, 4, and 5. The charging circuit 102 of the UPS 100 can have charging outputs 306 that may individually charge the batteries 302 directly and the batteries 304 indirectly, as in FIGS. 3, 4, and 5.

The conductors 206 of the output module 200 connect the battery sets 104 in series via the inputs 202 and 204 in FIG. 6. The inverter or converter 208 is a converter that converts the DC power from the battery sets 104 to output DC power different than the DC power from the battery sets 104. The capacitor 308 is connected between the conductors 206 and the converter 208.

The UPS 100 includes an auxiliary output module 600 that outputs AC power, such as equal to the AC power input to the UPS 100. The auxiliary output module 600 is connected to the output module 200 ahead of the inverter 208 (that is, between the conductors 206 and the inverter 208). The auxiliary output module 600 includes an inverter 602, which can be an only inverter of the output module 600, and which converts the DC power from the battery sets 104 to the output AC power.

When the AC power input to the UPS 100 is operational, the charging circuit 102 charges the battery sets 104 via this AC power (until the battery sets 104 have been completely charged). Regardless of whether the AC power input to the UPS 100 is operational or has failed, the output module 200 provides the output DC power by converting the DC power of the battery sets 104 to different DC power; if the AC power input has failed, such output DC power is provided until the battery sets 104 have been depleted of charge. Similarly, regardless of whether the AC power input to the UPS 100 is operational or has failed, the auxiliary output module 600 provides the output AC power by converting the DC power of the battery sets 104 to the output AC power; if the AC power input has failed, such output AC power is provided until the battery sets 104 have been depleted of charge. If the AC power input to the UPS 100 does fail, when it returns, the charging circuit 102 recharges the battery sets 104 via this AC power. The UPS 100 and the output modules 200 and 600 may not include the various switching mechanisms described in relation to FIG. 3, because the output DC power and AC power are generated by the converter 208 and the inverter 602, respectively, regardless of whether the AC power input to the UPS 100 is operational or not.

In one implementation, the UPS 100 of FIG. 6 may be considered a hybrid high line UPS due to the type of the output modules 200 and 600 connected thereto. The AC power input to the UPS 100 may have a voltage equal to that between two lines of a split-phase AC power feed, such as nominally 230 VAC, which is the common split-phase AC power feed in countries of North America as well as other countries. The battery sets 104 in series provide 6 kVA of apparent power (i.e., equal to twice that of each battery set 104 individually), and the DC power output by the battery sets in series may be 344-448 VDC. The converter 208 may be a 6 kW DC-to-DC converter that nominally outputs between 240 and 380 VDC. The inverter 602 may be a 1 kVA DC-to-AC inverter that nominally outputs 230 VAC.

Figure 7:
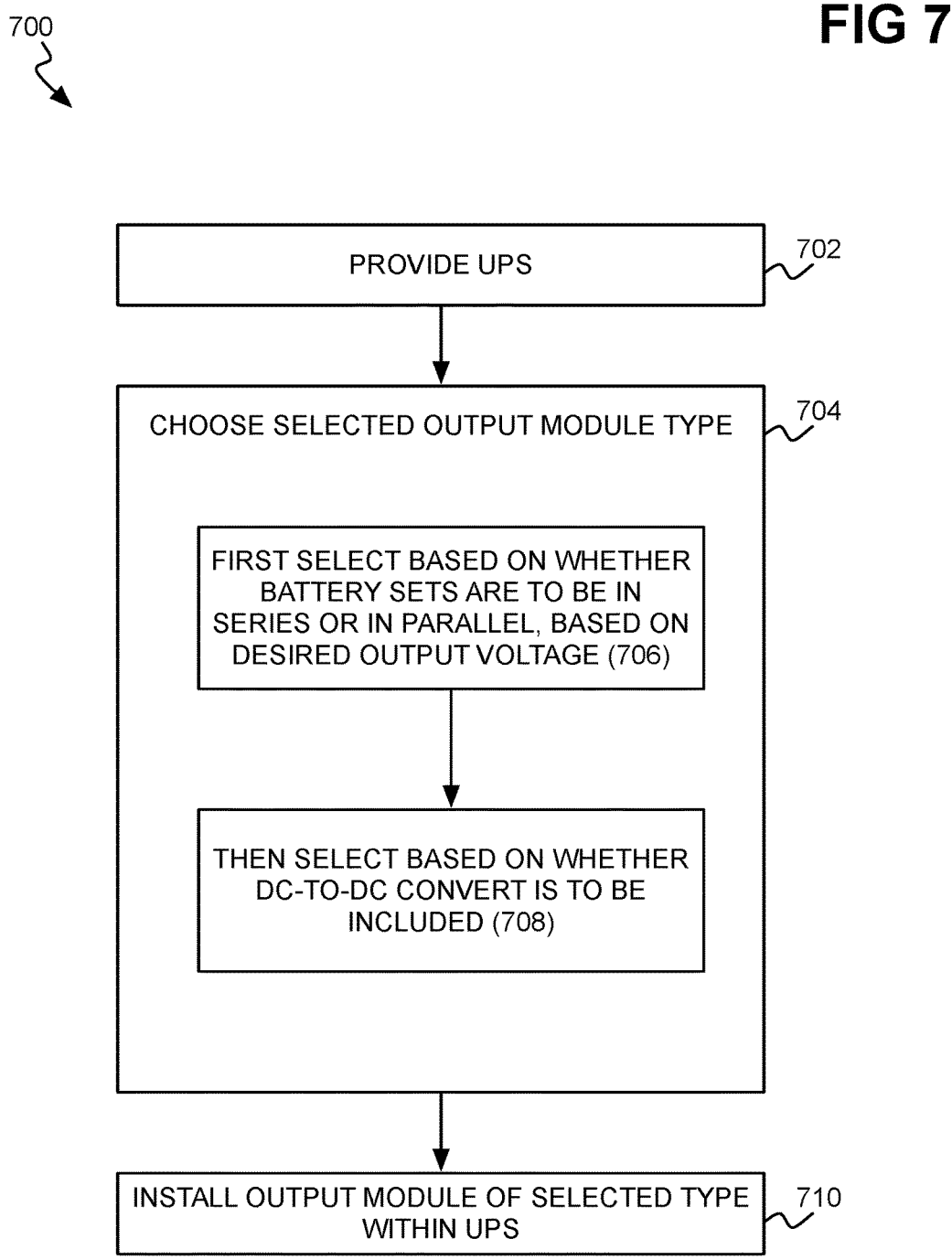
FIG. 7 is a flowchart of an example method.

FIG. 7 shows an example method 700 for using the UPS 100 in a desired manner. The UPS 100 is provided (702), without an output module 200 installed therein. A selected output module type is chosen (704). For instance, one of the types of output modules that have been described in relation to FIGS. 3, 4, 5, and 6 may be chosen. Specifically, the selected output module type can be chosen in a two-part process. First, based on the desired output voltage, multiple output module types that connect the battery sets 104 in series or in parallel are initially selected (706). Second, based on whether a DC-to-DC converter has to be included within the output module 200, a specific output module type of the multiple output module types that were initially type is selected (708).

An output module 200 of the selected type is then installed within the UPS 100 (710), which results in the formation of a complete electrical circuit between the battery sets 104 in series or in parallel, depending on the selected output module type. If later the UPS 100 is to be repurposed for different AC mains power and/or for different output power, the installed output module 200 can be removed and a different type of output module 200 installed therein. Furthermore, the auxiliary output module 600 can be connected to the UPS 100 in addition to the output module 200 of FIG. 6.

The techniques described herein thus provide for a reconfigurable UPS. The same UPS can be used in a variety of different scenarios by changing the type of output module connected to the UPS. The usage of just one inverter in many of these output module types increases efficiency and ameliorates heat and sizing issues of the UPS. By novelly having the battery sets, modules, or strings of the UPS forming an incomplete electrical circuit that is completed just when an output module is installed in the UPS, the battery sets can be connected in series or in parallel depending on the type and/or amount of power to be output by the UPS.

We claim:

1. An uninterruptible power supply (UPS) comprising:
    an output module, to connect to a first battery set and a second battery set in the UPS, comprising an inverter and a conductor;
    a charging circuit, connected directly to the first battery set, to change the first and second battery set using alternating current (AC) power; and
    a slot, receptive to insertion of the output module, wherein installing the output module in the slot connects the first and second battery sets in parallel or connects the first and second battery sets in series via the conductor; and completes an electrical circuit between the charging circuit, the first battery set, and the second battery set such that based on the completion of the electrical circuit, the charging circuit indirectly charges the second battery set;
    the inventor to convert direct current (DC) power from the first battery set and the second battery set based on the output module completing the electrical circuit with the charging circuit.

2. The UPS of claim 1, wherein the first battery set and the second battery set are part of an incomplete electrical circuit within the UPS without the output module having been inserted into the slot, the output module completing the electrical circuit between the first battery set and the second battery set.

3. The UPS of claim 1, wherein each of the first battery set and the second battery set comprises:
    a plurality of batteries connected in series.

4. The UPS of claim 3, wherein the charging circuit comprising:
    a plurality of charging outputs to connect to the batteries of just the first battery set to directly individually charge the batteries of just the first battery.

5. The UPS of claim 1, further comprising:
the output module inserted into the slot, the output module connecting the first and second battery sets in parallel, the output module including the inverter as just one inverter to convert the DC power from the first and second battery sets to the AC power.

6. The UPS of claim 1, further comprising:
the output module inserted into the slot, the output module connecting the first and second battery sets in parallel, the output module including a converter to convert the DC power from the first and second battery sets to different DC power and the inverter to convert the different DC power from the converter to different AC power.

7. The output module for the uninterruptible power supply (UPS) of claim 1, the output module comprising:
a pair of first inputs to connect to a pair of outputs of the first battery module of the UPS;
a pair of second inputs to connect to a pair of outputs of the second battery module of the UPS;
the conductors to connect the first battery set and second battery set in parallel or connect the first battery set and second battery set in series; and
the inverter to convert direct current (DC) power from the first and second battery sets.

8. The output module of claim 7, wherein the conductor connects the first and second battery sets in parallel to realize an apparent power of the first and second battery sets together equal to an apparent power of each of the first and second battery modules,
wherein the inverter is an only inverter of the output module and converts the DC power from the first and second battery sets to alternating current (AC) power having a voltage equal to half of a voltage between two lines of a split-phase AC power feed.

9. The output module of claim 7, wherein the conductor connects the first and second battery sets in parallel to realize an apparent power of the first and second battery modules together equal to an apparent power of each of the first and second battery sets,
wherein the output module includes a converter that is an only converter of the output module to convert the DC power from the first and second battery sets to different DC power,
and wherein the inverter is an only inverter of the output module to convert the different DC power from the converter to alternating current (AC) power having a voltage equal to a voltage between two lines of a split-phase AC power feed.

10. The output module of claim 7, wherein the conductor connects the first and second battery sets in series to realize an apparent power of the first and second battery sets together that is twice an apparent power of each of the first and second battery sets,
wherein the inverter is an only inverter of the output module to convert the DC power from the first and second battery sets to alternating current (AC) power having a voltage equal to a voltage between two lines of a split-phase AC power feed.

11. The output module of claim 7, wherein the conductor connects the first and second battery sets in series to realize an apparent power of the first and second battery sets together that is twice an apparent power of each of the first and second battery sets,
wherein the output module includes a converter that is an only converter of the output module to convert the DC power from the first and second battery sets to different DC power.

12. The UPS of claim 1, further comprising an additional output module inserted into the slot, the additional output module connecting the first and second battery sets in parallel, the additional output module including just one converter to convert the DC power from the first and second battery sets to different DC power.

13. The UPS of claim 12, further comprising an auxiliary output module connected to the additional output module between the just one converter of the additional output module and the first and second battery sets, the auxiliary output module including just one inverter to convert the DC power from the first and second battery sets to the AC power.

14. The UPS of claim 1, further comprising the output module inserted into the slot, the output module connecting the first and second battery sets in series, the output module including the inverter as just one inverter to convert the DC power from the first and second battery sets to AC power.

15. A method comprising:
providing an uninterruptible power supply (UPS) having a first battery string, a second battery string, a charging circuit, and a slot receptive to any of a plurality of different output module types, the plurality of different output module types including:
a first type that connects the first and second battery strings in parallel and converts first DC power from the first and second battery strings to first AC power;
a second type that connects the first and second battery strings in parallel and converts the first DC power from the first and second battery strings to second AC power;
a third type that connects the first and second battery strings in series and converts the DC power from the first and second battery strings to the second AC power; and
a fourth type that connects the first and second battery strings in series and converts the DC power from the first and second battery strings to second DC power;
choosing one of the first, second, third, and fourth output module types as a selected output module type, based on whether the first and second battery strings are to be in series or in parallel, and then based on whether a DC-to-DC converter is to be included in the UPS; and
installing a removable output module of the selected output module type within the slot of the UPS to complete an electrical circuit between the first and second battery strings within the UPS to connect the first and second battery strings in parallel or in series.

16. An uninterruptible power supply (UPS) comprising:
an output module including a plurality of conductors to connect first and second battery sets of the UPS together, the output module including a converter to convert DC power from the first and second battery sets to different DC power and an inverter to convert the different DC power from the convert to different AC power;
a charging circuit to directly charge the first battery set; and
a slot receptive to insertion of the output module, wherein installing the output module in the slot completes an electrical circuit that connects the first and second battery sets in parallel or connects the first and second battery sets in series via the conductors, and completes an electrical circuit between the charging circuit, the first battery set, and the second battery set via the conductors to indirectly charge the second battery set from the charging circuit,
wherein the inverter is configured to convert direct current (DC) power from the first battery set and the second battery set when the output module is installed in the slot.

* * * * *